(12) United States Patent
Dann

(10) Patent No.: US 6,248,244 B1
(45) Date of Patent: Jun. 19, 2001

(54) PORTABLE WATER TREATMENT ASSEMBLY

(75) Inventor: Stephen R. Dann, Port Orange, FL (US)

(73) Assignee: Eagle Spring Filtration, Inc., Holly Hill, FL (US)

(*) Notice: Subject to any disclaimer, the term of this patent is extended or adjusted under 35 U.S.C. 154(b) by 0 days.

(21) Appl. No.: 09/651,608

(22) Filed: Aug. 30, 2000

Related U.S. Application Data

(62) Division of application No. 09/266,150, filed on Mar. 10, 1999, now Pat. No. 6,129,841.

(51) Int. Cl.⁷ .................................................. C02F 1/50
(52) U.S. Cl. .......................................... 210/764; 210/767
(58) Field of Search .................................... 210/749, 764, 210/767, 255, 262

(56) References Cited

U.S. PATENT DOCUMENTS

| | | |
|---|---|---|
| 541,970 | 7/1895 | Harder . |
| 967,905 | 8/1910 | Hagg . |
| 1,052,440 | 2/1913 | Hagg . |
| 1,084,030 | 1/1914 | Ramsey . |
| 1,547,855 | 7/1925 | Burson . |
| 1,918,446 | 7/1933 | Barnes . |
| 2,411,341 | 11/1946 | Shepard . |
| 2,422,647 | 6/1947 | Vokes . |
| 4,094,779 | 6/1978 | Behrman . |
| 4,642,182 | 2/1987 | Drori . |
| 4,740,296 | 4/1988 | Roman . |
| 4,828,692 | 5/1989 | Peranio . |
| 4,882,052 | 11/1989 | Peranio . |
| 4,903,742 | * 2/1990 | Gagnon . |
| 4,957,624 | 9/1990 | Peranio . |
| 5,173,192 | 12/1992 | Shalev . |
| 5,240,620 | 8/1993 | Shalev . |
| 5,405,526 | * 4/1995 | Sutera . |
| 5,407,573 | * 4/1995 | Hughes . |
| 5,552,057 | * 9/1996 | Hughes et al. . |
| 5,562,824 | 10/1996 | Magnusson . |
| 5,908,553 | * 6/1999 | Reid . |
| 6,013,180 | 1/2000 | Wang . |

OTHER PUBLICATIONS

"The 'Mission' Portable Water Treatment System", undated, 2 pp., Eagle Spring Filtration, Inc., Holly Hill, FL.

* cited by examiner

Primary Examiner—David A. Simmons
Assistant Examiner—Betsey Morrison Hoey
(74) Attorney, Agent, or Firm—Cook, Alex, McFarron, Manzo, Cummings & Mehler, Ltd.

(57) ABSTRACT

A portable water treatment assembly and water treatment method are disclosed in which the water to be purified is placed in an upper container together with a suitable bactericide, and is held in that container until the bactericidal action is complete. At that time, an elongate dowel is manually manipulated to open a passage between the upper container and a lower container to drain the purified water through a sediment cartridge in the upper container to remove sediment from the water, and through a cartridge in the lower container containing a medium to remove the bactericide and/or other potentially distasteful ingredients from the water, and the purified water is collected in the lower container for subsequent dispensing and use.

12 Claims, 1 Drawing Sheet

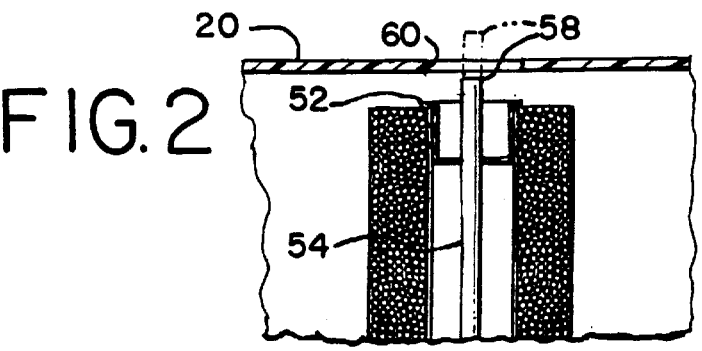
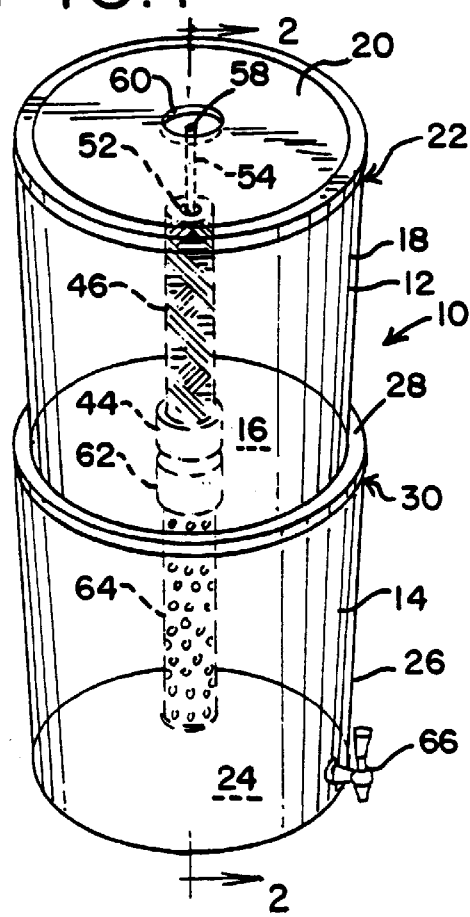
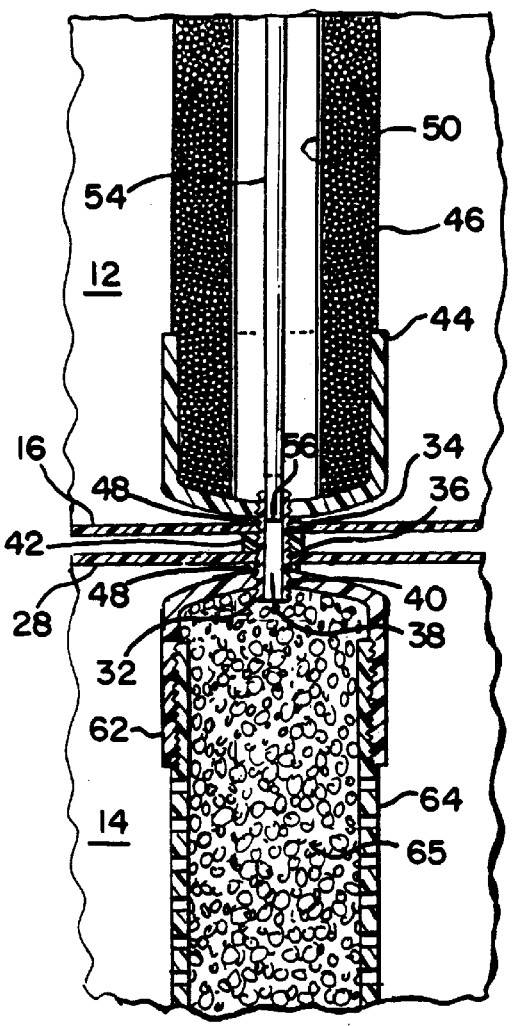
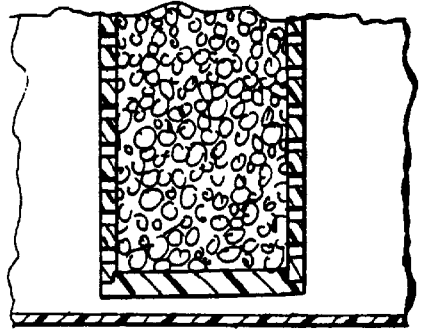

PORTABLE WATER TREATMENT ASSEMBLY

RELATED APPLICATIONS

This application is a division of application Ser. No. 09/266,150, filed Mar. 10, 1999, now U.S. Pat. No. 6,129,841, issued Oct. 10, 2000.

BACKGROUND AND SUMMARY OF INVENTION

The present invention relates to a portable water treatment assembly and method of treating water and, more particularly, to such assembly and method in which the water is simply and inexpensively treated with a bactericide at the point of use.

Many remote, difficultly accessible regions of the world have the need for simple, inexpensive, portable and easily useable equipment and/or methods for treating the water which is locally available at the location of ultimate use. In many instances, the water available at such locations has been bacterially contaminated and, to assure safe usage particularly as potable water, treatment with a bactericide is generally appropriate. However, effective water treatment systems which are typically operated by or under a regional governmental authority are usually not available.

In these situations, individual batches of water have been treated at the site of ultimate use using bactericidal agents which might be generally available to the user. These agents are usually inexpensive agents, such as household bleach. Although such locally available bactericidal agents have the advantage of availability and cost, the taste which they impart to the treated water which is to be ultimately consumed as potable water is usually objectionable. This is particularly the case when large amounts of such bactericidal agents, such as bleach, are needed to ensure complete kill of large quantities of bacteria which may be present in the available untreated raw water. Accordingly, it would be desirable to not only provide for the sterilization and treatment of available raw water from a standpoint of health, but to also reduce or remove to the extent possible any ingredients in the water, such as household bleach, following the treatment and which might otherwise impart undesirable tastes and odors to the treated water after it has been made ready for consumption. It is also desirable to be able to treat all of the water which is to be treated in a single assembly rather than using several individual disparate equipment components to carry out the entire treatment procedure.

One of the principal purposes of the present invention is to provide an assembly and method for the treatment of water which is portable, simple and inexpensive, but yet is capable of consistently and reliably purifying and treating water to make it safely drinkable. Another principal purpose of the present invention is to be able to not only remove undesirable ingredients from the treated water which may impart undesirable flavors and odors, such as halogenating bactericidal compounds like household bleach, but to also remove sediments and other contaminants which may be present in the water to be treated. It is also a purpose of the present invention to provide a portable, simple water treatment assembly having a minimum of components for its full functionality, and which may be easily transported, set up and operated in remote regions where reliable water treatment has not heretofore been available or possible.

In one principal aspect of the present invention, a water treatment assembly comprises first and second containers for containing the water which is being treated with each container having a bottom wall, a side wall and an openable top. A conduit communicates water from the first container through its bottom wall to the second container through its top, and a valve is operable between a first position in which the flow of water through the conduit from the first container to the second container is blocked, and to a second position in which the water in the first container is permitted to flow from the first container to the second container.

In another principal aspect of the present invention, the valve comprises an elongate rod having a bottom adjacent the bottom wall of the first container and a top adjacent the top of the first container, and the rod is movable to a position in which its bottom is either in the first or the second position.

In still another principal aspect of the present invention, the valve or rod is operable at a location adjacent the top of the first container.

In still another principal aspect of the present invention, removable walls cover the openable top of each of the containers.

In still another principal aspect of the present invention, the conduit is coupled to the bottom wall of the first container and the top wall of the second container and communicates the water from the first container to the second container.

In still another principal aspect of the present invention, the first container is vertically stacked and supported upon the second container.

In still another principal aspect of the present invention, the containers are buckets.

In still another principal aspect of the present invention, a separator is located in the first container for separating sediment from the water before the water flows through the conduit from the first container, and the conduit is coupled to the separator.

In still another principal aspect of the present invention, the separator is a string wound cartridge.

In still another principal aspect of the present invention, a water treatment element is located in the second container for treating the water as it flows through the conduit into the second container, and the conduit is coupled to the water treatment element.

In still another principal aspect of the present invention, the water treatment element is a charcoal filter.

In still another principal aspect of the present invention, the assembly is portable.

In still another principal aspect of the present invention, a method of treating water comprises placing the water to be treated in a first container together with an effective amount of a bactericide to kill bacteria which may be in the water which is to be purified, and holding the water and bactericide in the first container for a time sufficient to permit the bactericide to kill the bacteria. The treated water in the first container is drained to a second container beneath the first container by opening a valve between the containers, the water from the first container is passed through a medium for removing the bactericide as the water is draining from the first container, and the water from which the bactericide has been removed is collected in the second container.

In still another principal aspect of the method of the present invention, the valve is opened from a location adjacent the top of the first container.

In still another principal aspect of the method of the present invention, the water is also passed through a medium for removing sediment as the water is draining from the first container.

In still another principal aspect of the method of the present invention, the water passes first through the medium for removing sediment and then through the medium for removing the bactericide.

In still another principal aspect of the method of the present invention, the medium for removing sediment is positioned in the first container, and the medium for removing the bactericide is positioned in the second container.

In still another principal aspect of the method of the present invention, the medium for removing the bactericide is charcoal.

In still another principal aspect of the method of the present invention, the bactericide is household bleach. These and other objects, features and advantages of the present invention will be more clearly understood through a consideration of the following detailed description.

BRIEF DESCRIPTION OF THE DRAWING

In the course of this description reference will frequently be made to the attached drawing in which:

FIG. 1 is an overall prospective view of a preferred embodiment of water treatment assembly incorporating the principles of the present invention; and FIG. 2 is an enlarged, partially broken, cross sectioned frontal elevation view of the assembly as viewed substantially along line 2—2 of FIG. 1, and showing the coupling and arrangement of its component parts.

DESCRIPTION OF THE PREFERRED EMBODIMENT

As previously mentioned, the present invention is directed to a portable water treatment assembly, generally 10, and a method of treating water utilizing the assembly.

As shown in FIG. 1, the assembly 10 comprises a pair of containers including a first upper container 12 and a second lower container 14 positioned beneath and supporting the upper container 12. The upper container 12 generally includes a bottom wall 16 and an upwardly extending, preferably cylindrical sidewall 18. A cover wall or lid 20 is also preferably provided at the top 22 of the container 12 to cover the container to prevent undesirable contaminants from entering the container.

The lower container 14 also comprises a bottom wall 24, and an upwardly extending, preferably cylindrical sidewall 26 which together also define a compartment for holding water which has been purified by the assembly. The lower container 14 also, preferably, includes a removable cover wall or lid 28 at its top 30. The cover walls 20 and/or 28 are preferably attachably fixed to their respective containers such as by a snap fit.

The containers 12 and 14 are preferably formed of portable buckets of plastic or the like, and they preferably hold a sufficient amount of water for purification, for example, five gallons each. It will be understood, however, that the capacity of each of the containers may vary without departing from the purpose and scope of the present invention.

A short preferably threaded nipple 32, as best seen in FIG. 2, extends through an opening 34 in the bottom wall 16 of the upper container 12, and through an opening 36 in the cover wall 28 of the lower container 14. The nipple 32 includes a passage 38 over its length which defines a conduit between the upper container 12 and lower container 14 for draining the upper container to the lower container during use, as will be described below. The nipple 32 is also preferably threaded at 40 over its length to receive a suitable spacer and coupling nut 42 intermediate its length. The nipple 32 may be formed of any one of a number of suitable materials, such as nylon.

A cup 44 is located in the upper container 12 for holding a sediment cartridge 46 to remove sediment in the water to be treated as the water is being drained from the upper container 12 to the lower container, as will be described below. The cup 44 is preferably threaded onto the threaded nipple 32, as best seen in FIG. 2, with a suitable washer 48 between the bottom wall 16 of the upper container 12 and the bottom of the cup. Thus, it will be seen that when the cup 44 is firmly threaded onto the nipple 32, the nipple will be mounted to the bottom wall 16 of the upper container 12 and to the sediment cartridge 46.

The sediment cartridge 46 may take any one of a number of suitable constructions which are sufficient to retain most of the undesirable particulate contaminants that may be in the raw water in the upper container 12. For example, the sediment cartridge 46 may consist of one or more strings wrapped repeatedly about a pervious hollow core 50 so as to permit drainage of the water in the upper container 12 through the string rovings and into the interior of the core 50 from where it will drain through the passage 38 in the nipple 32 to the lower container 14.

The core 50 of the sediment cartridge 46 also preferably includes a guide plug 52 adjacent its top. The guide plug 52 closes the core to prevent undesirable contaminants from entering the core. The guide plug 52 also receives an elongate rod, such as a wood dowel 54. The bottom 56 of the dowel extends into the top of the passage 38 in the nipple 32, as seen in solid in FIG. 2, to form a valve which closes the passage 38 to prevent draining of the water from the upper container 12 to the lower container 14 at a time when draining is not desired, i.e. during treatment of the raw water with the bactericidal agent. The top 58 of the dowel rod 54 preferably extends to a location adjacent the top cover wall 20 of the upper container 12 from where it may be easily manually accessed through, for example, a small opening 60 in the cover wall 20 to open and close the passage 38 during operation of the assembly, and without the need to remove the cover wall 20.

A lower downwardly facing cup 62 for retaining another water treatment cartridge 64 is also threaded upon the other lower end of the nipple 32, preferably with another washer 48 interposed between the cup 62 and cover wall 28 of the lower container 14. Thus, the cover wall lid 28 and its lower container 14 upon which it is fixed, as well as the cup 62 will be firmly affixed to the nipple 32, as best seen in FIG. 2.

The cartridge 64 which is mounted to the cup 62 preferably comprises a shell which is pervious to the flow of water. It is preferably perforated or a mesh and is capable of holding a particulate water treatment medium 65, such as activated charcoal for the removal of substances in the water which, for example, produce undesirable flavors and/or odors. The treatment medium in the cartridge also preferably will remove or substantially reduce bactericidal agents after they have performed their bactericidal function, such as bleach or other halogen containing agents which may have been added to the water to kill any bacteria in the water as will be described below.

A tap 66 is also preferably provided adjacent the bottom of the lower container 14 for the selective removal of water for use and consumption which has been purified and collected in the lower container.

In the method of the present invention, the raw water to be treated and purified is poured into the upper container 12 and an effective amount of bactericide to kill any bacteria which may be in the water is added to the water in the upper container. For example, where the upper container 12 is a five-gallon bucket, one-fourth of a cup (2 ounces) per five gallons of water of a household bleach (5.5% solution) may be added to the water and should effectively kill any bacteria in the water.

As the raw water is being added to the upper container 12, the dowel 54 is in the position shown in solid in FIG. 2 in which its bottom 56 blocks the passage 38 to prevent drainage of the water from the upper container to the lower container. After the upper container 12 has been filled with the raw water to be treated, the removable cover wall 20 is then positioned on the top of the upper container 12 to prevent any extraneous and undesirable contaminants from entering the upper container during the ensuing treatment process. The raw water to be purified is then allowed to set, together with the bactericide for a sufficient amount of time, for example, 30 minutes, to permit the bactericide to kill any bacteria which may have been present in the raw water which is to be purified.

The dowel 54 which permits closure of the passage 38 prevents the drainage of the water from the upper container 12 during treatment with the bactericide and, thus, avoids the need for a separate bucket or other container which is not part of the assembly to perform this treatment function.

After the water has been allowed to set for a sufficient time with the bactericide, the top 58 of the dowel 54 is manually manipulated through the opening 60 in the cover wall 20 at the top 22 of the upper container to lift the bottom 56 of the dowel 54 from the passage 38 to the position shown in dot and dash in FIG. 2. This will result in the water in the upper container 12 trickling through the sediment cartridge 46 into the core 50, and from there drain through the passage 38 in the nipple 32 to the cartridge 64 in the lower compartment 14. Where the cartridge 64 contains a medium for the removal of the bactericide, such as activated charcoal, the water will also trickle through the activated charcoal to remove a substantial portion of the otherwise possibly offensive bactericide, and that water will be collected in the lower container 14 to ultimately be dispensed through the tap 66.

It will be appreciated that the water treatment assembly and method of the present invention is quite portable and is capable of being transported to and used in remote areas at the location of ultimate use, and by unsophisticated users for water purification where water purification may not otherwise be available. It will also be appreciated that the assembly and method of the present invention is simple, compact, and inexpensive in its construction and performance.

It will also be understood that the preferred embodiment of the present invention which has been described is merely illustrative of the principles of the invention. Numerous modifications may be made by those skilled in the art without departing from the true spirit and scope of the invention.

I claim:

1. A method of treating water, comprising placing the water to be treated in a first container together with an effective amount of a bactericide to kill bacteria which may be in the water which is to be purified;

holding the water and bactericide in the first container for a time sufficient to permit the bactericide to kill the bacteria;

draining the treated water in the first container to a second container beneath the first container by opening a valve between the containers;

passing the water from the first container through a medium for removing the bactericide as the water is draining from the first container; and collecting the water from which the bactericide has been removed in the second container.

2. The method of claim 1, wherein said valve is opened from a location adjacent the top of the first container.

3. The method of claim 1, including also passing the water through a medium for removing sediment as the water is draining from the first container.

4. The method of claim 3, wherein the water passes first through the medium for removing sediment and then through the medium for removing the bactericide.

5. The method of claim 4, wherein the medium for removing sediment is positioned in the first container, and the medium for removing the bactericide is positioned in the second container.

6. The method of claim 1, wherein the medium for removing the bactericide is positioned in the second container.

7. The method of claim 1, wherein the medium for removing the bactericide is charcoal.

8. The method of claim 1, wherein the bactericide is household bleach.

9. The method of claim 1, wherein at least said first container is at atmospheric pressure.

10. The method of claim 1, wherein the flow of water from said first container to said second container when said valve is opened is by gravity.

11. The method of claim 1, wherein the valve is shut following the collection of the water in the second container.

12. The method of claim 1, wherein substantially all of the water is drained from the first container to the second container at the time the valve is opened.

* * * * *